A. A. DE LOACH.
SLIDING FRICTION DRIVING MECHANISM.
APPLICATION FILED AUG. 14, 1907.
909,372.
Patented Jan. 12, 1909.
2 SHEETS—SHEET 1.
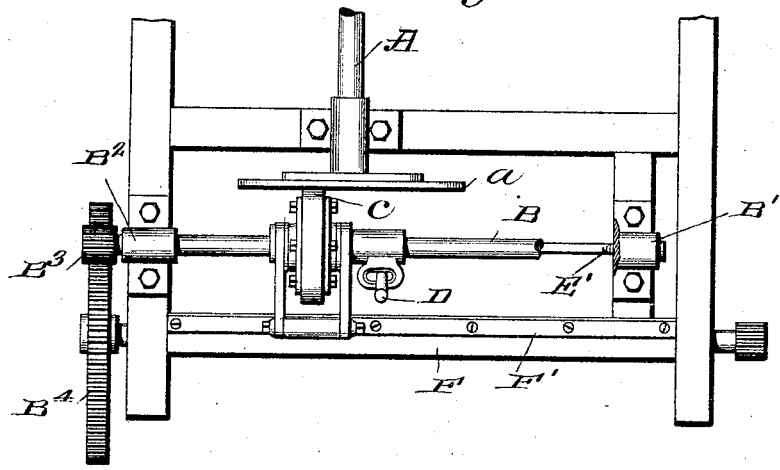
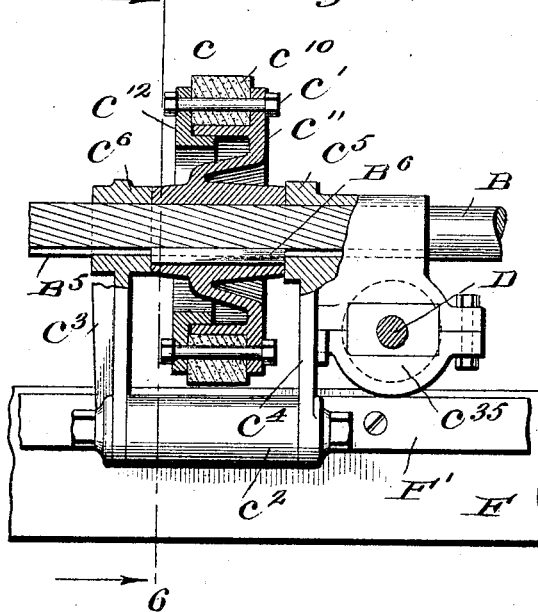
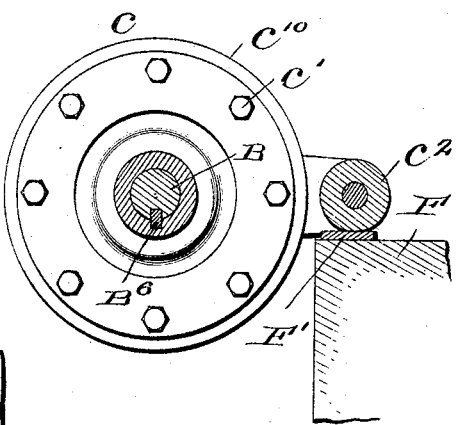

A. A. DE LOACH.
SLIDING FRICTION DRIVING MECHANISM.
APPLICATION FILED AUG. 14, 1907.
909,372.
Patented Jan. 12, 1909.
2 SHEETS—SHEET 2.
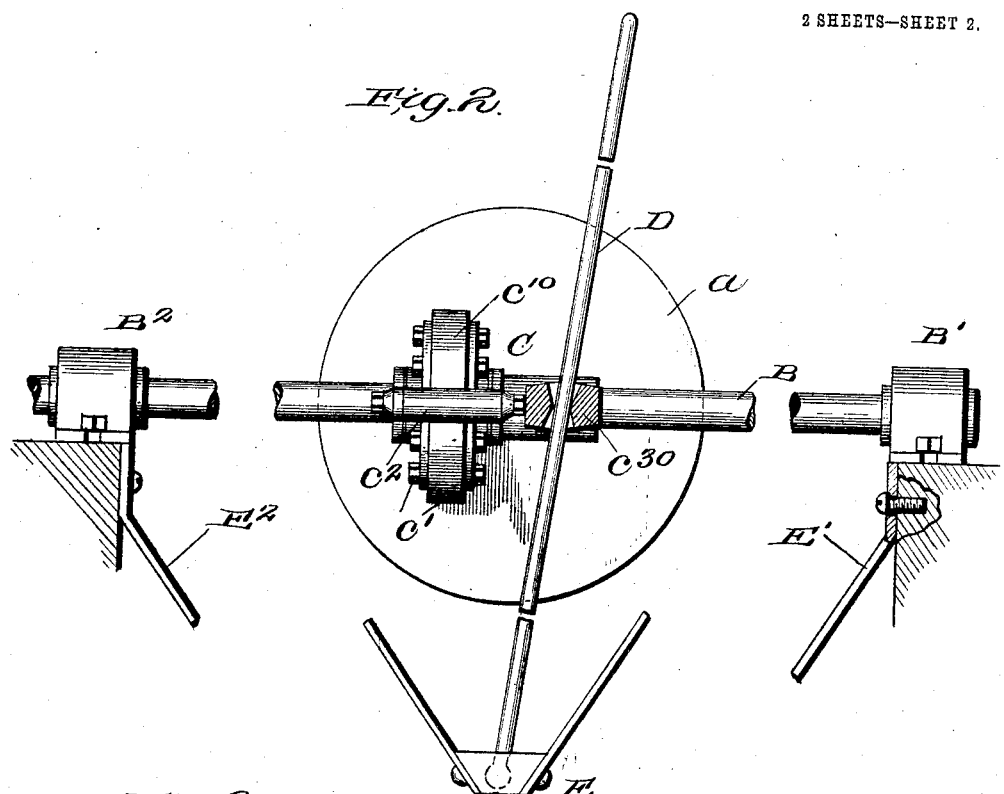
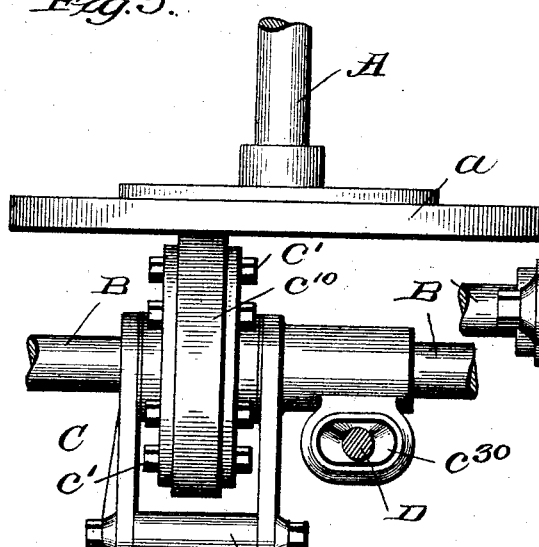
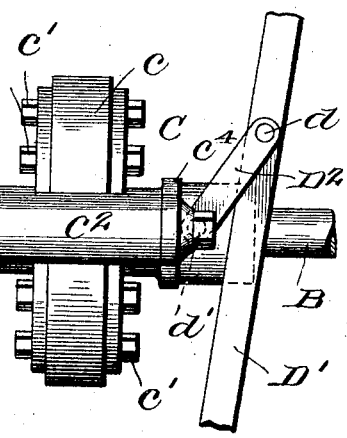
Witnesses
Inventor
A. A. De Loach
by Wilkinson, Fisher
and Witherspoon
Attorneys

UNITED STATES PATENT OFFICE.

ALONZO A. DE LOACH, OF BRIDGEPORT, ALABAMA.

SLIDING FRICTION DRIVING MECHANISM.

No. 909,372.     Specification of Letters Patent.     Patented Jan. 12, 1909.

Application filed August 14, 1907. Serial No. 388,521.

*To all whom it may concern:*

Be it known that I, ALONZO A. DE LOACH, a citizen of the United States, residing at Bridgeport, in the county of Jackson and State of Alabama, have invented certain new and useful Improvements in Sliding Friction Driving Mechanism; and I do hereby declare the following to be a full, clear, and exact description of the invention, such as will enable others skilled in the art to which it appertains to make and use the same.

My invention relates to a sliding friction driving mechanism, specially applicable to saw mill husks, and the object of my invention is to provide such a mechanism that will be certain in action, convenient to operate, and comparatively inexpensive to manufacture.

To these ends, my invention consists in providing a saw mill husk, or other mechanism, with a rotating disk, through which power is transmitted, and with a loose pulley sliding on a shaft, adapted to engage said disk and move across the face of the same. Said pulley is also provided with a yoke controlling said loose disk, and the said disk is keyed to the shaft by means of a straight bar key, which is controlled by the hubs of said yoke, all as will be more fully hereinafter disclosed.

My invention also consists in the combination of parts and details of construction hereinafter described and particularly pointed out in the claims.

Referring to the accompanying drawings forming a part of this specification;—Figure 1 is a plan view of my mechanism showing a portion of the saw mill husk broken away. Fig. 2 is an end view of my device showing the shaft carrying the loose wheel and the stirrups supporting the operating lever broken away. Fig. 3 is a plan, on an enlarged scale, showing the disk transmitting the power and the friction wheel and yoke. Fig. 4 is a side elevation of the friction wheel and yoke showing a modified form of operating lever and a modified connection between the same and the yoke. Fig. 5 is a plan of my movable portion of the device showing the loose wheel in section, the key securing the same to the shaft, and a modified bearing for the operating lever. Fig. 6 is a section taken on the line 6—6 of Fig. 5.

Like letters indicate like parts in all the views.

A indicates the shaft transmitting power to the disk $a$.

B indicates a shaft secured in the bearings $B'$, $B^2$ on the saw mill husk, and $B^3$ a pinion secured to one end of said shaft B.

$B^4$ represents the usual gear wheel which translates the carriage back and forth.

The shaft B is provided with a slot $B^5$ in which fits a substantially straight key $B^6$, shown in Fig. 5.

C represents a yoke provided with the arms $c^3$ and $c^4$, and with the cross connecting arm $c^2$. The arm $c^3$ is provided with the hub $c^6$ and the arm $c^4$ is provided with the hub $c^5$, as shown. Between the hubs $c^5$ and $c^6$ on the shaft B, loosely fits the friction wheel $c$, and this wheel is slidingly attached to said shaft B by means of the straight key $B^6$, above mentioned, and the said key is controlled and reciprocated along the slot $B^5$ by means of the said hubs $c^5$ and $c^6$, all as clearly shown in Fig. 5

D represents an operating lever which passes through a bearing $c^{30}$, attached to the arm $c^4$ of the yoke C. This bearing is preferably cast in one piece with the arm $c^4$ of the yoke, and its opening, through which the shaft D passes, is beveled in opposite directions, as shown, in order to permit the free movement of the lever D, as will be more fully hereinafter explained. The lower end of said lever is shipped in a shoe E supported by stirrups $E'$ and $E^2$, as shown in Fig. 2. These stirrups may be conveniently pivoted to the supports for the bearings $B'$ and $B^2$ of the shaft B, as best shown in section in Figs. 1 and 2, so as to permit a slight movement of the lever to and from the disk $a$, for a purpose hereinafter disclosed.

F represents a cross beam of the husk and $F'$ a metal strip securely fastened to the same. The cross connecting arm $c^2$ slides along this strip $F'$, when the clutch is in operation, and is guided thereby. The loose wheel $c$ of the clutch is composed of the paper or fibrous ring $c^{10}$, and the disks $c^{11}$ and $c^{12}$, provided with flanges fitting the one inside the other, as shown in Fig. 5. The said disks are secured together by the bolts $c'$ passing through the same and through the said fibrous ring $c^{10}$.

In the modified form, shown in Fig. 4, the bearing $c^{30}$ for the lever D is omitted, and the lever D' is substituted, which is by means of a link $D^2$, connected at the point $d$ with the said lever, and at the point $d'$ with the arm $c^4$, all as shown in Fig. 4.

In the modified structure disclosed in Fig. 5, the lever D instead of being provided with the bearing $c^{30}$, is provided with the modified bearing $c^{35}$, consisting of an ordinary ball and socket joint secured to the arm $c^4$, as shown.

In operation, power is applied to the shaft A, and the loose wheel $c$ is moved across the face of the disk $a$ by manipulating the lever D or D'. As is well known in this type of devices, when the surface of ring $c^{10}$ is in the center of the disk $a$, practically no motion is transmitted to the shaft B, but when the said ring $c^{10}$ is shifted from the center of said disk $a$ from one side to the other, then motion is transmitted to the shaft B in one direction or the other and said motion increases as the ring $c^{10}$ approaches the edge of the disk $a$. It results from this motion of the surface of ring $c^{10}$ that the carriage is reciprocated through the gear B in one direction or the other, and at a rapidly accelerated velocity, which, of course, is very desirable in sawmill carriages.

By simply slotting the shaft B, and the hub of the wheel C, as shown, I may drop a simple key $B^6$ into the said slots, and by securing the arms $c^3$ and $c^4$ on each side of this key, I provide an exceedingly simple, cheap, and effective device which in actual practice has proved exceedingly satisfactory. In addition to this, by guiding the cross arm $c^2$ of the yoke C on the cross beam F, as shown, I dispense with the necessity of gripping the hand lever D at all times, for when the ring $c^{10}$ is once placed in position it stays so, and when it is desired to change its position, the yoke and guide F' steady the parts so that there is no difficulty whatever in its operation. The cross arm $c^2$, however, may be slightly lifted off the guide F', owing to the springiness and looseness of the parts, when it is desired to slide said arm along the beam F, as will appear more fully below.

By providing for a slight pivoted movement in the stirrups, as above stated, the operator can cause the yoke to slightly rotate around the shaft and thereby avoid its sticking, due to its encountering unevennesses, when attempting to slide it along the shaft; and he can at the same time give a slight motion to the surface of ring $C^{10}$, toward the disk $a$, owing to the slight looseness and springiness of the parts. Therefore, the operator can by pulling the lever D in a direction at right angles to the plane of the disk $a$, lessen the amount of pressure of the said ring $c^{10}$ upon the disk $a$, or by pushing the said lever in the opposite direction he can increase the said pressure. It results directly from this that the operator can, while the carriage is moving at an accelerated rate, govern the speed of the same to a nicety by the simple device of increasing or decreasing the pressure between the surface of ring $c^{10}$ and the disk $a$, this change in pressure of course being rendered more certain by the pivots of the stirrups, of E' and $E^2$, lessening the liability of the yoke to stick, as above mentioned.

In this class of machines it is very desirable to have a fibrous or paper engaging surface for ring $c^{10}$, as shown. This surface, owing to the material out of which it is made, often shrinks and wears, and therefore it is very convenient to have a device such as the lever D which can be so manipulated as to compensate for this shrinking or wearing. In addition to this, I have so constructed the wheel $c$ that by simply tightening up on the bolts $c'$, I may press the ring $c^{10}$ outward, and thereby additionally compensate for any shrinking or wearing that may occur.

Besides the important feature of holding the key $B^6$, as disclosed, between the hubs of the yoke C, the shaft B revolves in a smooth bore of the said hubs and thereby the friction and wear is reduced to a minimum, which would not be the case were the old style of collar, fitted around the hub, employed. Besides, no complications in the operation of the hand lever D are encountered, as was the case with the old style of device. That is to say, the construction I show of holding the key between the hubs of my yoke and the sliding of the device without a collar of any kind on the hub, I regard as one of the main features of my invention. The lower end of the lever D is merely rested in the shoe E, which may be cast, and therefore the expense of providing a pivot is avoided.

An important practical feature of my invention resides in the fact that I machine the shoulder on the wheel $c$ so as to accurately fit the inner circle of the fiber ring, and therefore, the ring is kept in correct position, even though the bolts $c'$ should work loose. This feature also enables me to replace an old ring with a new one, and secure a perfect fit without any danger of its being out of true.

I do not wish to be understood as limiting myself to the exact details of construction shown, for equivalent constructions would readily suggest themselves to those skilled in this art.

Having now described my invention what I claim and desire to secure by Letters Patent, is:—

1. In a sliding friction driving mechanism, the combination of a slotted shaft; a wheel provided with a slotted hub; a key located in said hub; a yoke on said shaft provided with hubs adapted to hold said key in place; a power or transmitting disk with which said wheel engages; a lever rotatably mounted on said shaft, and pivoted stirrups in which the lower end of said lever is seated, substantially as described.

2. In a sliding friction gear, the combination of a wheel comprising two disks and a ring of fibrous material held between the same; a power transmitting disk over which said ring slides, one of said disks having a slotted hub; a slotted shaft on which said hub slides, a key in the slots of said hub and shaft; a yoke between the arms of which said wheel and key are placed; a hand lever for operating said yoke, and pivoted stirrups receiving the lower end of said lever, substantially as described.

3. In a sliding friction gear, the combination of a power transmitting shaft; a disk attached thereto; a second shaft provided with a slot; a friction wheel provided with a slotted hub free to slide on said second shaft; a yoke between the arms of which said wheel is placed; a key in the hub of said wheel and held by the arms of said yoke; a hand lever; a bearing for the same integral with one of the arms of said yoke; a shoe in which the lower end of said lever is shipped, and supports for the shoe, substantially as described.

4. In a sliding friction gear, the combination of a disk; a friction wheel; a shaft on which the same is mounted; a yoke between the arms of which said wheel is placed; a hand lever for operating said yoke; a bearing for the same; a pair of pivoted stirrups, and a shoe in which the lower end of said lever is shipped, substantially as described.

5. In a sliding friction gear, the combination of a power transmitting disk; a slotted shaft; a wheel thereon contacting with and sliding over said disk and having a slotted hub; a yoke provided with hubs between which said wheel is located; a key located partly in said shaft and partly in the hub of said wheel, and between the hubs of said yoke; a guide for said yoke; a lever for oscillating and sliding said yoke, and pivoted stirrups receiving the lower end of said lever, substantially as described.

6. In a sliding friction gear, the combination of a power transmitting shaft; a disk attached thereto; a second shaft provided with a slot; a wheel free to slide thereon, provided with a friction surface adapted to slide over said disk and having a slotted hub; a key located partly in the slot of said shaft and said hub; a yoke between the arms of which said wheel and key are located; a guide independent of said slotted shaft for said yoke; a lever adapted to both oscillate and slide said yoke, and pivoted stirrups receiving the lower end of said lever, substantially as described.

7. In a sliding friction gear, the combination of a power transmitting disk; a slotted shaft; a wheel having a slotted hub on said shaft; a key in the slot of said hub; a yoke between the arms of which said key is located; a guide for said yoke; an operating lever, and a bearing for the same rigid with one of the arms of said yoke, substantially as described.

8. In a sliding friction gear, the combination of a power transmitting disk; a shaft; a wheel on the same; a yoke between the arms of which said wheel is located; a guide independent of said shaft for said yoke; a lever for operating the yoke; a bearing rigid with the yoke for said lever; a shoe in which the lower end of said lever is shipped, and supports for the shoe, substantially as described.

9. In a sliding friction gear, the combination of two friction members; a yoke for sliding one of the same; a guide for said yoke; a lever for operating said yoke; a pair of pivoted stirrups, and a shoe in which the lower end of said lever is shipped, substantially as described.

10. In a sliding friction gear, the combination of a slotted shaft a wheel on the shaft provided with a friction ring and having a slotted hub; a key in the hub; a yoke between the arms of which said key is located; a lever for oscillating and sliding said yoke, and a pair of pivoted stirrups receiving the lower end of said lever, substantially as described.

11. In a sliding friction gear, the combination of a shaft; a wheel on the same provided with a friction ring; a yoke between the arms of which said wheel is located; a lever having a bearing integral with said arm for operating said yoke; a power transmitting disk over which said ring reciprocates, and a pair of pivoted stirrups provided with a shoe receiving the lower end of said lever, substantially as described.

12. In a sliding friction gear, the combination of a shaft; a wheel on the same provided with a friction ring; a yoke between the arms of which said wheel is located; a guide independent of the shaft for said yoke; a lever for operating said yoke, and a pair of pivoted stirrups provided with a shoe receiving the lower end of said lever, substantially as described.

13. In a saw mill husk, a friction gear comprising a loose wheel, having a fiber friction ring, in combination with a yoke for operating said wheel; a guide on the husk for said yoke; a hand lever for oscillating and sliding said yoke, and a pair of pivoted stirrups provided with a shoe for receiving the lower end of said lever, substantially as described.

14. In a saw mill husk, a friction gear comprising a shaft; a loose wheel on the same having a paper fiber friction ring; a yoke for operating the wheel; a guide on the husk for the yoke; a hand lever and stirrups pivoted below said shaft and having a shoe for receiving the lower end of said lever, substantially as described.

In testimony whereof, I affix my signature, in presence of two witnesses.

ALONZO A. DE LOACH.

Witnesses:
T. L. WRIGHT,
J. CUNNINGHAM.